United States Patent [19]

Vorbau

[11] Patent Number: 5,063,879
[45] Date of Patent: Nov. 12, 1991

[54] CHILD RESTRAINT METHOD AND APPARATUS FOR AIRCRAFT AND OTHER VEHICLES

[76] Inventor: John H. Vorbau, 32472 Azores Rd., Laguna Niguel, Calif. 92677

[21] Appl. No.: 439,439

[22] Filed: Nov. 20, 1989

[51] Int. Cl.[5] ............................................. A62B 35/00
[52] U.S. Cl. ........................................ 119/96; 280/290
[58] Field of Search ...................... 119/96 R; 280/290; 128/875, 876; 182/3; 224/160, 264

[56] References Cited

U.S. PATENT DOCUMENTS

| | | | |
|---|---|---|---|
| 967,454 | 8/1910 | Small | 128/875 |
| 1,310,958 | 7/1919 | O'Connor | 119/96 |
| 2,817,393 | 12/1957 | Mitchell | 182/3 |
| 3,004,519 | 10/1961 | Weissman | 182/3 |
| 3,046,982 | 7/1962 | Davis | 128/875 |
| 3,321,287 | 5/1967 | Dillender | 182/3 |
| 4,026,245 | 5/1977 | Arthur | 119/96 |
| 4,553,633 | 11/1985 | Armstrong et al. | 119/96 |
| 4,657,005 | 4/1987 | Williamson | 128/875 |
| 4,840,144 | 6/1989 | Voorhees et al. | 119/96 |
| 4,911,105 | 3/1990 | Hocum | 119/96 |

OTHER PUBLICATIONS

Air Transport Association of America, "ATA Statement of Use of Infant Child Restraint", 1989.
American Academy of Pediatrics, "1989 AAF Car Safety Guidelines".
U.S. Department of Transportation, "Use of Child/Infant Seats in Aircraft", 2/26/85.
Snyder, Richard G., "The Status of Infant/Child Restraint Protection in Crash Impacts".
Calspan Corporation Advanced Technology Center, "Child Restraint System Tests Performed on Simulated Aircraft Passenger Seats", 1983.

Primary Examiner—John G. Weiss
Attorney, Agent, or Firm—Stetina and Brunda

[57] ABSTRACT

An apparatus for holding a child on the lap of an adult while traveling in a moving vehicle. The apparatus generally comprises a body-surrounding means, such as a harness, strap, vest, torso band, woven member, fabric belt, or other structure positionable about the body of a child and attachable to some stationarily anchored member or portion of the vehicle. In a preferred embodiment, the body surrounding means is attachable to a standard lap seat belt, such as those provided to adult passengers on commercial airliners.

7 Claims, 2 Drawing Sheets

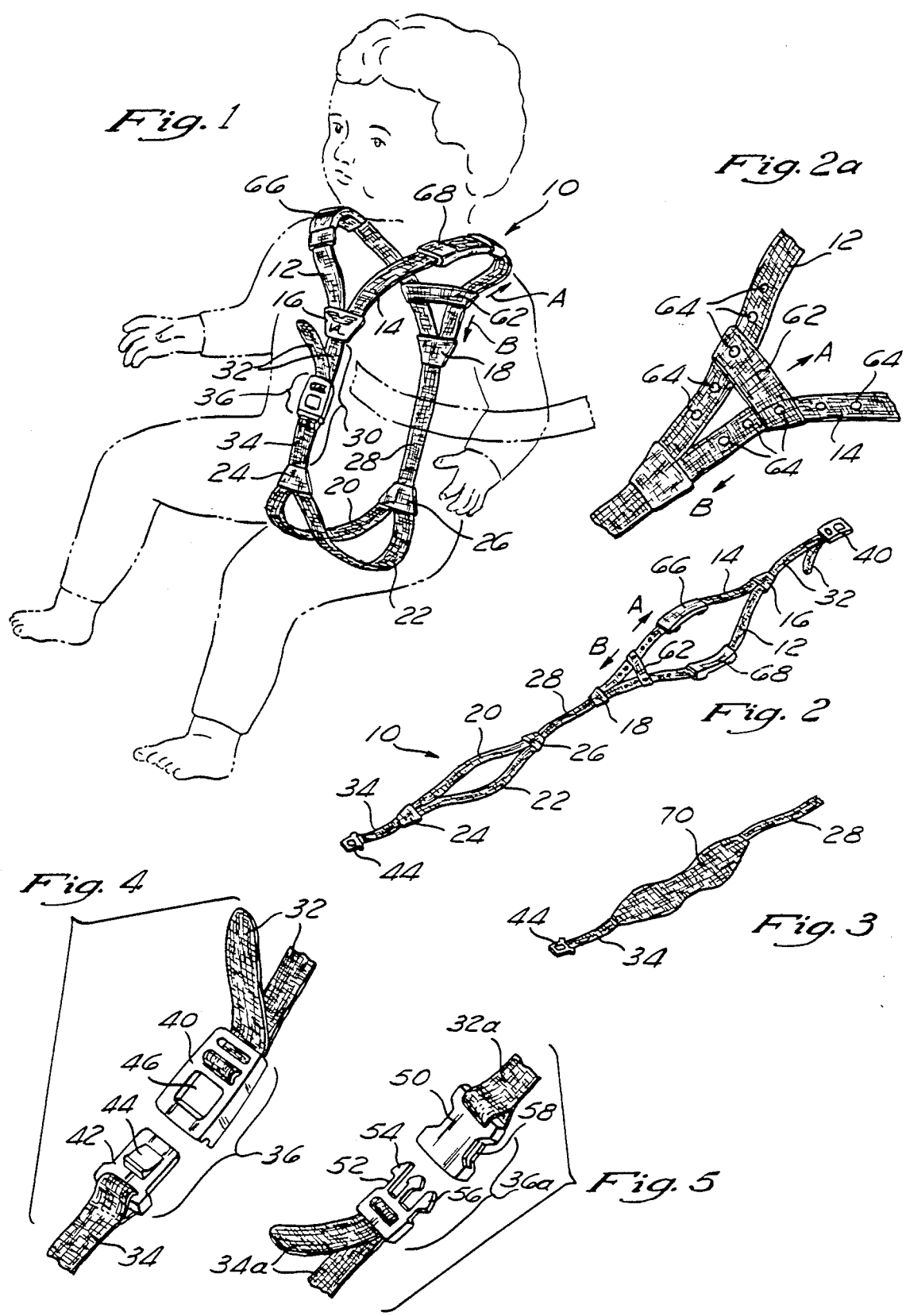

CHILD RESTRAINT METHOD AND APPARATUS FOR AIRCRAFT AND OTHER VEHICLES

FIELD OF THE INVENTION

The present invention pertains generally to vehicular passenger safety restraint systems and more particularly to a safety restraint method and apparatus for securing children while seated on the lap of an adult passenger of an airliner or other vehicle.

BACKGROUND OF THE INVENTION

Many commercial airlines in the United States presently allow young children (e.g. children of less than two years of age) to fly free of charge, or for reduced fares, provided that they remain seated on the lap of an adult traveling companion during flight. The reasoning which underlies such policy is that a child who remains seated on the lap of an adult travel companion does not occupy a separate passenger seat and, thus, may be afforded a fare reduction or fare waiver without substantial monetary loss to the airline. Such policy is believed to encourage air travel by young families or individuals having small children who, in many cases, would be unable to afford the cost of such travel if it were necessary for them to purchase a separate seat for each small child.

While the above-stated policy may well promote desirable economic and business concerns, such policy is highly undesirable from a standpoint of child safety. On most, if not all, commercial airliners, a child seated on the lap of an adult travel companion is left without any safety restraint. As a result, sudden turbulence, movement, rapid positional change, or impact of the aircraft may thrust or inertially propel the child from its position on the lap of the adult and about the cabin of the aircraft, possibly resulting in severe injury and/or death to the child.

Standard emergency landing/pre-crash procedures adopted by many airlines call for the adult travel companion to firmly grasp and hold the child upon the adult's lap during a crash or emergency landing. While such practice may prevent injury to the child during minor decelerations or turbulent conditions, it is believed that such procedure is wholly inadequate to safely restrain and hold the child during an actual crash, rapid positional change, or rapid deceleration.

In view of the above-stated shortcomings of the prior art, there exists a need for a child restraint apparatus which is operative to securely hold a child on the lap of an adult travel companion seated in a moving vehicle, such as a commercial airliner.

SUMMARY OF THE INVENTION

The present invention overcomes some or all of the shortcomings of the prior art by providing an apparatus for holding a child on the lap of an adult (e.g. adult, teenager, or older child) travel companion in a moving vehicle. In general, the method and apparatus of the present invention comprises placement, a harness, strap, vest, torso band, woven member, fabric belt, or other body surrounding means positionable about the body of the child and attachable to some stationarily anchored member or portion of the vehicle to hold the child on the lap of the adult travel companion and to prevent the child from being carried by inertia or otherwise removed from the lap of the adult travel companion in the event of sudden deceleration, turbulence, movement, or impact of the vehicle.

In accordance with a more limited aspect of the invention, the child safety apparatus of the invention may comprise a harness, belt, vest, torso band, woven member, fabric belt, or any other body surrounding means positionable about at least a portion of the body of the child and attachable to a standard lap seat belt, shoulder harness, or any other type of safety belt commonly employed to safely hold adult passengers in their seats while traveling in vehicles, such as aircraft or automobiles.

Further, in accordance with the invention, the child restraint apparatus may comprise a harness-like apparatus comprising at least one shoulder strap member positionable over a shoulder of the child, a front strap extending generally vertically downward over the abdomen of the child, at least one crotch strap or soft pad positionable under the crotch and between the legs of the child, and a back strap extending generally vertically up the back of the child, each of said straps being interconnected to form a substantially unitary harness-like apparatus positionable about the body of the child. A buckle or other connection/disconnection means may be incorporated into the harness to facilitate donning and/or removal of the harness.

Still further in accordance with the invention the harness may incorporate one or more connectors or connecting means whereby the harness may be easily attached to an adjacent, stationarily anchored structure, such as an adult's lap seat belt, shoulder harness, vehicle armrest, seat, etc.

In accordance with yet another aspect of the invention, various adjustment means and/or adjustment mechanisms, such as strap shortening/lengthening components and the like, may be incorporated into the child restraint apparatus in order to facilitate size-adjustment of the apparatus, thereby rendering the apparatus usable in connection with various sized children (e.g. infancy through two (2) years of age).

Still further in accordance with the invention, the body surrounding means (e.g. the child's harness) may incorporate various accessory or additional safety features, such as a cervical support/neck collar and/or flotation apparatus to cause the child to float in the event of a water landing or submersion of the vehicle.

A principal object of the invention is to prevent children from being injured or killed in vehicular accidents, such as aircraft crashes.

Another object of the invention is to provide a child safety restraint method and apparatus which may be connected to a standard lap seat belt or other anchoring means so as to safely hold a child on the lap of an adult or in an unoccupied vehicle seat.

A further object of the invention is to provide a child restraint method and apparatus Which may be used in vehicles, such as automobiles, as a substitute for the commonly used child safety seat, when such child safety seat is unavailable.

A still further object of the invention is to provide a child safety method and apparatus of the foregoing character which is sufficiently adjustable to be employable with children of varying ages (e.g. from infancy through two (2) years of age), lightweight, portable, and not prohibitively expensive.

Further objects and advantages of the invention will become apparent to those skilled in the art upon reading and understanding of the following detailed description of a presently preferred embodiment of the invention and consideration of the accompanying drawings.

BRIEF DESCRIPTION OF THE DRAWINGS

FIG. 1 is a perspective view of a child safety apparatus of the present invention operatively disposed on the body of a small child;

FIG. 2 is a perspective view of a child safety apparatus of the present invention inoperatively disposed in an outstretched configuration;

FIG. 2a is a outaway perspective view of a portion of the child's safety apparatus shown in FIG. 1;

FIG. 3 is a cutaway view of a portion of a child's safety belt of the present invention incorporating an optional crotch pad replacing the dual crotch straps shown in the apparatus of FIGS. 1 and 2;

FIG. 4 is a perspective cutaway view of a portion of the child's safety belt shown in FIG. 1;

FIG. 5 is a cutaway view of a portion of a child's safety belt in accordance with the invention incorporating an optional buckle type, different from that shown in FIGS. 1, 2, and 4;

DETAILED DESCRIPTION OF A PREFERRED EMBODIMENT

Figure 8:
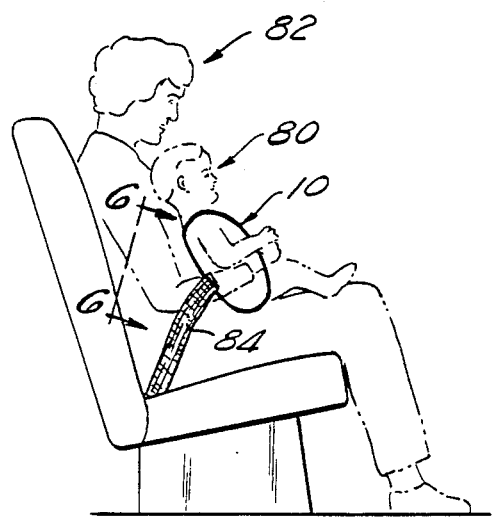
FIG. 8 is a side elevational illustration of a child wearing a safety apparatus of the present invention while seated on the lap of an adult travel companion.

The following detailed description, and the drawings to which it refers, are provided for the purpose of illustrating and describing certain embodiments of the invention and are not intended to limit the scope of the invention in any way.

In general, the present invention comprises a child's safety apparatus which is attachable to any stationarily structure, or to a standard lap seat belt, shoulder harness, or other safety restraint normally positionable around the body of an adult travel companion while the child is seated or otherwise positioned on the lap of the adult travel companion. One important application of this invention is to firmly attach a child to a standard lap seat belt or other restraint means provided to an adult passenger of an airliner or other vehicle. Accordingly, the invention is described herein with references to such application. It will be appreciated, however, that the apparatus of the present invention is not limited to uses in connection with standard lap seat belts. In fact, the apparatus of this invention may be attachable to any anchoring means including but not limited to a separate belt member provided in addition to the standard lap seat belt of the adult passenger, or any other stationary portions of the vehicle.

Also, the apparatus of the present invention is usable in applications other than those wherein the child is seated on an adult's lap. For instance, adults who are flying on commercial aircraft with their small children sometimes seek out unoccupied passenger seats to lay or sit their small children on during flight. In such situations, the apparatus may be directly engaged with or connected to the buckled lap seat belt of the unoccupied seat so as to firmly hold and restrain the child while sitting or lying in the unoccupied seat.

A specific embodiment of the invention, shown in FIG. 1, comprises a harness-like apparatus 10 having first 12 and second 14 shoulder straps positioned over the shoulders of the child. The front and rear ends of the shoulder straps 12, 14 are connected to first and second joining members 16 and 18, respectively. As shown, when the apparatus 10 is operatively disposed upon the body of the child, the first joining member 16 is positioned over the center of the anterior thorax while the second joining member 18 is positioned over the center of the posterior thorax, generally between the shoulder blades of the child. The first joining member 16, when operatively positioned over the anterior thorax of the child, provides a clearly visible surface upon which an airline logo or the like may be displayed, as shown in FIG. 1.

First and second crotch straps 20, 22 extend under the crotch and between the legs of the child. The first and second crotch straps 20, 22 are connected frontally to a third joining member 24 and in the rear to a fourth joining member 26. When the apparatus 10 is operatively disposed on the body of the child, it is preferable that the third joining member 24 be positioned generally over the lower abdomen (i.e. below the navel yet above the genitalia) of the child. The fourth joining member 26 is preferably positioned over the lower back, slightly above the coccyx.

A back strap 28 extends vertically between, and is firmly connected to, the second 18 and fourth 26 joining members. Multiple back straps may also be employed, however, in the embodiment shown a single back strap 28 is employed.

A front strap 30 extends vertically between the first 16 and third 24 joining members. Such front strap 30 comprises upper 32 and lower 34 strap segments with a buckle 36 positioned therebetween. As shown in FIG. 1, the buckle 36 serves to releasably join the upper 32 and lower 34 strap segments together to form a generally unitary, vertically disposed front strap member 30. Multiple front strap members may also be employed, however, in the embodiment shown a single front strap 30 is employed.

It is preferable that the buckle 36 be of a type that will enable rapid and uncomplicated release of the child from the harness.

Any suitable type(s) of buckle(s) or closure mechanism(s) may be employed in place of the specific buckle 36 shown. The buckle 36 is shown in an enlarged, exploded view in FIG. 4. Such buckle comprises a female portion 40 and a male portion 42. The male portion 42 of the buckle 36 is insertible into the female portion 40. A depressible, spring biased button 44 is mounted on the frontal surface of the male portion 42 of the buckle 36. When the male portion 42 of the buckle 36 is inserted into the female portion 40 thereof, the button member 44 will spring outwardly into the rectangular aperture 46 of the female portion 40 of the buckle, thereby frictionally engaging the female 40 portion of the buckle 36 so as to hold the buckle 36 in its joined or buckled configuration. The buckle 36, when joined or buckled, is sufficiently sturdy to endure any foreseeable inertial or strain placed on the buckle 36 during an airline crash, vehicular crash, severe turbulence, or other foreseeable incident.

When it is desired to remove the apparatus 10 from the body of the child 80, the button 44 of buckle 36 is depressed inwardly and the male portion 42 of the buckle 36 is extracted or removed from the female portion 40 thereof. The outward spring bias or tension of the button 44 is preferably substantial enough to prevent small children (e.g. less than two years of age) from depressing the button 44, thereby ensuring that the child 80 will not inadvertently disengage the buckle 36 during use.

On other examples of the many buckle types which may be incorporated and used in connection with the present invention is shown in FIG. 5. Such alternate buckle type 36a comprises a female member 50 and a tri-prong male member 52. The male member 52 is slidably insertible into the female member 50. When inserted into the female member 50 the lateral processes or lugs 54, 56 formed on the outer prongs of the male member 52 will spring or otherwise extend out of side apertures 58 formed in the body of the female member 50. When it is desired to unbuckle or disconnect the buckle 36a, the lateral processes or lugs 54, 56 of the side members must be depressed sufficiently to permit them to clear the remainder of the body of the female member 50, thereby permitting the male member 52 to be extracted from its position within the female member 50. The tension required to so depress the lateral processes 54, 56 of the outer members of the male member 52 is preferably such that a small child (e.g. less than two years of age) would be unable to effect such action, thereby ensuring that the child 80 will not inadvertently disengage the buckle 36a during use.

It will be appreciated that many types of adjustment mechanisms may be incorporated into the apparatus 10 to permit adjustment of the size of the apparatus to fit various sizes of children. It is preferable that the apparatus 10 be rendered sufficiently adjustable to fit children from infancy through age two (2). In the embodiment shown in FIGS. 1, 4, and 5, the length of the strap members 34 and/or 32 attached to the buckle 36, 36a may be adjusted by drawing the tail of such strap members through a gripping loop member, thereby shortening the overall length of the harness 10. Other adjustment mechanisms or means may be utilized to effect further adjustment (e.g. shortening and/or lengthening) of the apparatus and/or its various belt members.

Indeed, any or all of the individual belt segments which make up the harness may be endowed with length-wise adjustability by incorporating standard adjustment mechanisms and/or means previously or hereafter known in the art. Indeed, the joining members 16, 18, 24, 26 which serve to join the individual strap members may themselves comprise slidable adjustment members which, when advanced upwardly on the shoulder straps 12, 14 or downwardly on the crotch straps 20, 22 will serve to pull such shoulder 12, 14 or crotch 20, 22 straps closer together so as to snugly and appropriately fit the particular child on whom the apparatus 10 is disposed.

Additionally, it is desirable that the shoulder straps 12, 14 be held snugly in a desirable position over the shoulders of the child. To wit: each shoulder strap 12, 14 should pass over the top of the child's shoulder, lateral to the neck yet medial to the acromioclavicular junction of the shoulder. Such positioning of the shoulder straps 12, 14 will serve to minimize the likelihood of injury to the neck or shoulder joints in the event of a sudden impact or crash. In order to achieve such desirable positioning of the shoulder straps 12, 14 in various-sized children, one or more adjustment member(s) 62 may be provided for altering or adjusting the width or distance between the shoulder straps 12, 14 when operatively disposed on the body of a child. As shown in FIGS. 1, 2, and 2a, the adjustment member 62 comprises a rigid, semi-rigid, or flexible member which traverses between the left and right shoulder straps 12, 14. The slidable adjustment member 62, shown in FIG. 2a, is attachable at various points along the shoulder straps by way of snaps or attachment points 64. It is to be appreciated, however, that the adjustment member 62 may be attached or fixed at desired points on the straps 12, 14 by many other types of affixation or strap gripping mechanisms, presently or hereafter known in the art, including clamps, clips, jaws, snaps, buttons, gripping members, etc. One advantage to using clasps or gripping members as opposed to the snaps 64 shown in FIG. 1 is that such clamps or strap gripping members are attachable at virtually any point on the strap members 12, 14 so as to allow fine adjustment of the straps. The use of snaps 64 or buttons, on the other hand, permits attachment of the adjustment member 62 only at predetermined discrete locations whereat the snaps 64 or buttons have been located.

As the adjustment member 62 is advanced upwardly (arrow A) along the shoulder straps 12, 14, the member 62 will cause the shoulder straps 12, 14 to be drawn more closely together (i.e. medially, toward the midline of the wearer's body). Conversely, when the member 62 is retracted downwardly (arrow B), it will allow the shoulder straps to spread further apart (i.e. laterally toward the shoulders of the child). Such will enable and/or assist in adjusting the positioning of the shoulder straps 12, 40 on the wearer's shoulders and will aid in adjusting the apparatus 10 to a desired position. Although the drawing (FIG. 1) shows only one (1) such adjustment member 62 deployed on the back portions of the shoulder straps 12, 14, it will be appreciated that additional and/or alternative adjustment members 62 may be deployed on the front portions of the shoulder straps 12, 14 and/or the front and/or rear portions of the crotch straps 20, 22 to achieve further and/or alternative adjustability of the harness 10.

Optional shoulder pads 66, 68 are positioned on portions of the shoulder straps 12, 14 so as to provide comfort during normal wear and to provide additional cushioning and injury prevention in the event of a sudden impact or undue turbulence.

An optional crotch pad 70 made of netting, fabric, flexible plastic, or other material may be used in place of the dual crotch straps 20, 22. This optional crotch pad 70 is particularly useful when the apparatus 10 is being used with older children who no longer wear diapers. In such children, it is desirable that one avoid unnecessary irritation of or possible injury to the genitalia and, thus, the use of a flexible and/or contoured crotch pad 70 may be a desirable option in such older children. It will be appreciated that the flexible and/or contoured crotch pad 70 may be form fitted, pouched, or otherwise shaped for maximum comfort of the child during wearing of the apparatus 10. With younger children who routinely wear diapers, it is believed that the use of the dual crotch straps 20, 22, as shown in FIG. 1, will be satisfactory and will not cause undue irritation or injury to the genitalia in the event of a sudden impact.

Another optional accessory which may be added to the basic apparatus 10 of the present invention is a slidable or non-slidable connecting member 72 to facilitate connection of the apparatus 10 to a lap seat belt, shoulder harness, or other safety restraint means of the type commonly provided to adult passengers in aircraft, automobiles, and other vehicles.

Figure 6:
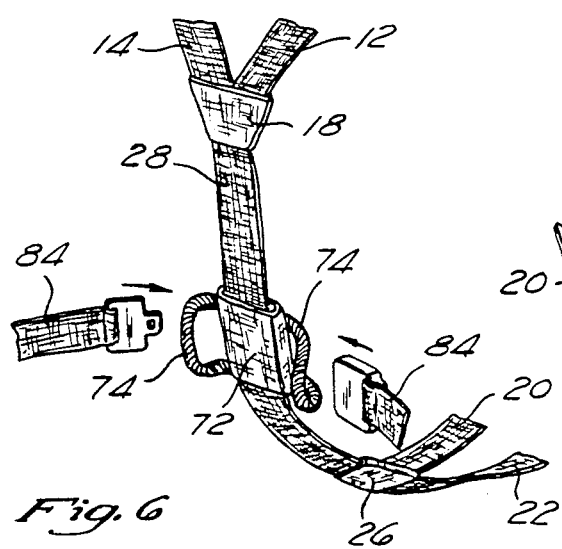
FIG. 6 is a cutaway view of a portion of a child safety apparatus of the present invention incorporating an optional slidable attachment member to facilitate attachment of the apparatus to the lap seat belt of an adult travel companion as shown in FIG. 5.
Figure 7:
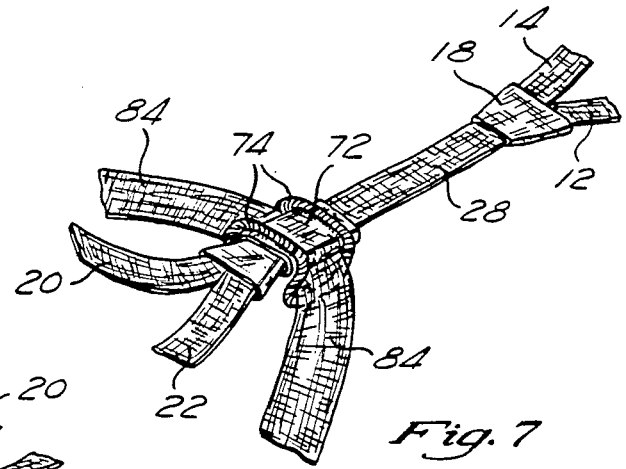
FIG. 7 shows a cutaway perspective view of a portion of a child's safety harness of the present invention incorporating a slidable attachment member disposed to facilitate attachment to a lap seat belt of an adult travel companion with the child in a crash-ready position as shown in FIG. 9.

Specifically, as shown in FIGS. 6 and 7, a slidable member 72 or body may be disposed on the back strap 28 portion of the apparatus 10 so as to be slidably movable between at least a first position and a second position. Loop members 74 form a part of and extend rearwardly from the slidable member 72. Such loop members 74 are sized and configured to permit passage of the seat belt, restraint harness, or other means therethrough. Specifically, in the embodiments shown, the loop members 74 are spaced sufficiently far apart to permit the buckle portion of a standard lap seat belt to comfortably reside therebetween. FIG. 6 shows the slidable member 72 positioned in a first position such that, when the seat belt 84 is inserted therein and buckled, the child 80 will be held in a comfortable seated position on the lap of a an adult passenger, as shown in FIG. 8.

Figure 9:
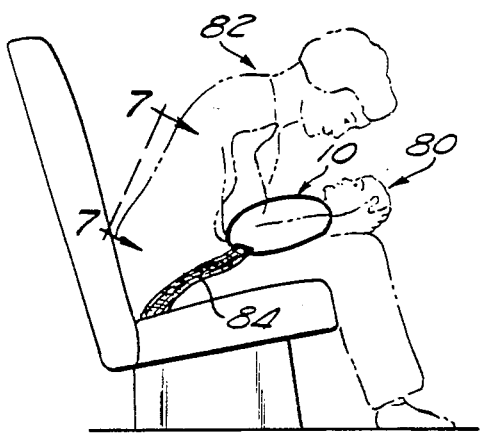
FIG. 9 is a side elevational illustration of a child wearing a safety apparatus of the present invention while positioned in a crash-ready position on the lap of an adult travel companion.

FIG. 7 shows the slidable member 72 disposed in a second position, consistent with a "crash-ready" posture. When in such second position, the seat belt 84 of the adult is once again inserted through the loop portions 84 of the slidable member 72 and securely buckled. With the seat belt so disposed, the child 80 is held securely in a supine or dorsally recumbent position on the lap of the adult, as shown in FIG. 9.

It will be appreciated that the provision of a non-slidable or slidable attachment member 72 is not necessary to the functioning of the apparatus 10. A standard lap seat belt or other belt means may easily be passed between the back strap 28 of the apparatus and the body of the child so as to firmly connect and hold the body of the child on the lap of the adult in either the seated or "crash-ready" positions, shown in FIGS. 8 and 9.

Other optional accessories, such as cervical/neck supports for small children and/or flotation devices, may also be attached and/or incorporated into the apparatus 10.

OPERATION OF THE PRESENTLY PREFERRED EMBODIMENT

The preferred mode of operation of the child's safety apparatus 10 of the present invention is illustrated in FIGS. 8 and 9. As shown in FIG. 8, under normal traveling conditions the child 80 is seated on the lap of an adult traveling companion 82. The apparatus 10 of the present invention is operatively disposed about the body of the child. The lap seat belt 84, shoulder harness, or other restraint means of the adult traveling companion 82 or other stationary or anchored restraint means is connected to the apparatus 10 so as to securely hold the child 80 in a seated position on the lap of the adult traveling companion 82. With the child in such normally seated position (depicted in FIG. 8), the adult companion's lap seat belt 84 engages the apparatus 10 and thereby serves to restrain the child and prevent the child from being projected or inertially moved from the lap of the travel companion 82 in the event of severe turbulence, rapid positional change, or unexpected impact.

In the event of an impending impact or crash landing, it is standard practice for the adult traveling companion 82 to place the child 80 in a "crash-ready" position on the lap of the adult travel companion 82. Accordingly, should it become necessary to assume such "crash-ready" position, the apparatus 10 of the present invention is easily deployable to an alternate crash-ready disposition, as depicted in FIG. 9. Specifically, the child 80 is positioned in a generally supine or dorsally recumbent position on the lap of the adult travel companion 82. The legs of the child may extend on either side of the body of the adult travel companion 82. It is preferable that the adult travel companion 82 cradle the child's head in his/her hands while bending over the child in a protective fashion, as illustrated in FIG. 9. If possible, the travel companion 82 may bend fully over the child so that his/her head is immediately adjacent the head of the child. The lap seat belt 84 of the adult travel companion is firmly connected to the apparatus 10 adjacent the buttocks or lower back of the child 80 so as to firmly hold or restrain the child 80 on the lap of the adult travel companion 82 and to prevent the child from being propelled forward in the event of an impact or sudden stop.

The buckle 36 may be quickly unbuckled or detached to release the child from the apparatus 10 even as the apparatus 10 remains engaged with or connected to the adult's seat belt 84. Alternatively, the buckle of the adult's seat belt 84 may be unbuckled or detached to free the child from restraint, while the buckle 36 of the apparatus 10 remaining closed or buckled such that the apparatus 10 remains deployed in its operative position on the child's body.

If the child's safety apparatus 10 of the present invention is provided with an optional attachment member 72 (FIGS. 6 and 7), the lap seat belt 84 of the adult travel companion may be passed into and connected to such attachment member 72. If the child's safety apparatus 10 is not provided with such optional attachment member 72, the lap seat belt 84 may simply be passed between the body of the child and one or more of the strap members or other portion(s) of the apparatus 10. As such, the adult's seat belt 84 will effectively engage the apparatus 10 so as to hold the child securely on the lap of the adult traveling companion 82.

When not in use, the apparatus 10 is sufficiently lightweight and portable to be easily stored and carried in a coat pocket or carry-on bag. If a commercial airline were to maintain a supply of such apparatus 10 on board each airliner, the apparatus 10 could easily be stored in a drawer, cabinet, or overhead luggage rack and dispensed or loaned to passengers on an as-needed basis.

The foregoing description and illustrations of the preferred embodiments are intended only to aid in understanding and description of the invention. Numerous modifications and changes to the depicted embodiments will readily occur to those skilled in the art. For example, instead of a harness-like apparatus 10 it may be desirable to employ an alternative embodiment, such as a vest, jacket, torso band, singular belt member, strap, plurality of straps, lightweight netting, or other materials/configurations capable of achieving the desired function of the invention. Additionally, the child restraint apparatus 10 of the present invention need not be specifically connectable to a lap seat belt, or other safety restraint of the adult travel companion, as shown in the above-described preferred embodiment. Indeed, a separate anchoring belt, strap, or any other attachment member may be employed for attaching the child restraining apparatus 10 of the invention to any anchoring structure or surface of the vehicle (e.g. the seat, armrests, floor, etc.). Also, the child need not be seated on the lap of an adult for the apparatus 10 of the invention to be usable. Indeed, the apparatus 10 may be attachable to a buckled seat belt or other anchoring means when the child is lying or seated in an unoccupied passenger seat, not on the lap of an adult.

It is intended that all of the above-mentioned modifications and alternatives, and others, be included within the scope of the following claims and the equivalents thereof.

What is claimed is:

1. A child safety restraint apparatus for holding a child on the lap of an adult travel companion seated in a moving vehicle, said apparatus comprising:

a harness positionable about at least a portion of the body of the child, said harness comprising:
 a plurality of shoulder strap members having first and second ends, each said shoulder strap member being positionable over a shoulder of the child in such manner that the first end of each said shoulder strap is disposed over the anterior thorax of the child while the second end of each said shoulder strap member is disposed over the posterior thoras of the child;
 at least one crotch strap member having first and second ends, each said crotch strap member being positionable between the legs and under the crotch of the child such that the first end of the crotch strap member is disposed generally over the lower abdomen of the child and the second end of the crotch strap member is disposed generally over the lower back of the child;
 at least one back strap member attached to and extending between the second end of said at least one shoulder strap member nd the second end of said at least one crotch strap member; and
 at least one front strap member attached to and extending between the first end of said at least one crotch strap member nd the first end of said at least one shoulder strap member;
 said shoulder strap member, crotch strap member, back strap member, and front strap member being sized, configured, and interconnected to form a harness-like apparatus disposable about the body of a child and attachable to a stationarily anchored object;

at least one attachment member movably mounted on said harness for attaching said harness to the lap seat belt worn by the adult, said attachment member being movable on said harness between (a) a "routine " position wherein the child is held in a generally seated position on the lap of the adult travel companion and (b) a "crash ready " position wherein the child is held in a generally supine lying position on the lap of the adult travel companion with the child's buttocks being adjacent the waist of the seated adult;

said at least one attachment member being slidably mounted on and movable over at least a portion of said back strap.

2. The child safety restraint of claim 1 wherein said at least one attachment member is slidably mounted on and movable over at least a portion of said back strap so as to be alternately positionable adjacent (a) the lower back of the child and (b) the buttocks of the child.

3. The child safety restraint of claim 1 wherein said at least one attachment member comprises a first loop member and a second loop member, said first loop member and said second loop member being configured and positioned to receive and hold the buckle portion of a lap seat belt therebetween.

4. A child safety restraint apparatus for holding a child on the lap of an adult travel companion seated in a moving vehicle, said apparatus comprising:

a body surrounding means positionable about at least a portion of the body of the child;

at least one attachment member movably mounted on said body surrounding means and attachable to a stationarily anchored structure while the child is positioned on the lap of the adult travel companion so as to hold the child on the lap of the adult travel companion and to prevent movement of the child from the lap of the adult travel companion in the event of sudden deceleration or positional change of said vehicle;

said at least one attachment member being movably mounted on the body surrounding means so as to be alternately positionable (a) adjacent the lower back of the child and (b) adjacent the buttocks of the child, whereby the child may be alternately moved between;
 (a) a "routine" position wherein the child is held in a generally seated position on the lap of the adult travel companion; and
 (b) a "crash-ready" position wherein the child is held in a generally supine lying position on the lap of the adult travel companion with the child's buttocks being adjacent the waist of the seated adult.

5. The child safety harness of claim 4 wherein said at least one attachment member is slidably mounted on and movable over at least a portion of said back strap.

6. The child safety restraint of claim 4 wherein said attachment member is movably mounted on said harness so as to be alternately positionable (a) adjacent the lower back of the child and (b) adjacent the buttocks of the child.

7. The child safety restraint of claim 4 wherein said at least one attachment member comprises a first loop member and a second loop member, said first loop member and said second loop member being configured and positioned to receive and hold the buckle portion of a lap seat belt therebetween.

* * * * *